No. 892,549. PATENTED JULY 7, 1908.
H. H. PONTON.
WRENCH.
APPLICATION FILED FEB. 1, 1908.

Witnesses

Inventor
Henry H. Ponton.
By C. A. Snow & Co.
Attorneys

UNITED STATES PATENT OFFICE.

HENRY H. PONTON, OF HOPE, TEXAS.

WRENCH.

No. 892,549.  Specification of Letters Patent.  Patented July 7, 1908.

Application filed February 1, 1908. Serial No. 413,897.

To all whom it may concern:

Be it known that I, HENRY H. PONTON, a citizen of the United States, residing at Hope, in the county of Lavaca and State of Texas, have invented a new and useful Wrench, of which the following is a specification.

This invention relates to wrenches, more especially to such as are used for removing the nuts which retain vehicle wheels on their axles; the object being to provide a simple and quickly applied device consisting of a plate having a socket thereon to slip over the nut and two projecting arms to extend over the hub of a vehicle wheel with a clamping means for fastening the whole firmly to the hub. Then, by turning the wheel backwards the nut will be unscrewed from the axle and retained within the hub.

With this and other objects in view the invention consists of the novel construction and arrangements of parts hereinafter described and claimed, reference being had to the accompanying drawing, in which—

Figure 1:
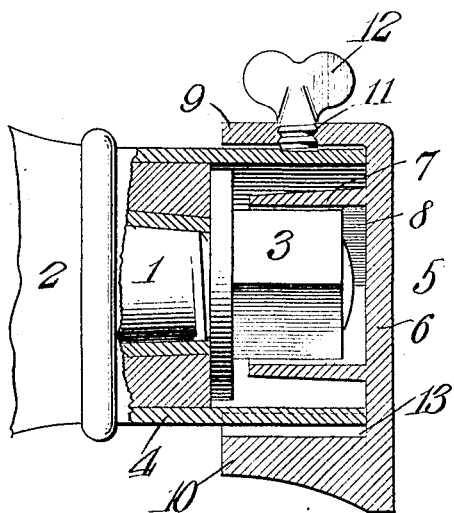
Figure 2:
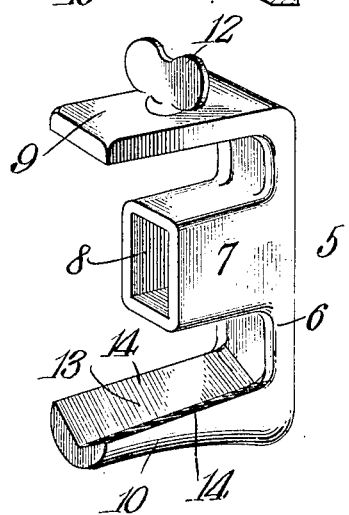
Figure 3:
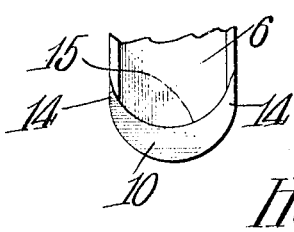

Figure 1 is a vertical sectional view of the left hub of a vehicle wheel with the improved wrench applied, as seen from the rear; Fig. 2 is a perspective view of the wrench; and Fig. 3 is a detail view of a modification.

Similar reference numerals are used for the same parts in all the figures.

On the end of a vehicle axle 1 is the hub 2 of a wheel held in place thereon by a nut 3 over which extends the metal band 4 on the end of the hub, all as usually found on the majority of vehicles.

The wrench 5 comprises a plate 6 of the desired length and width, depending on the size of the hub, from one side of which plate projects a socket 7 about the center thereof having a square or other shaped opening 8 adapted to fit over the nut 3. As the majority of axle nuts are square the wrench will be generally made with a socket approximately of this shape.

Extending from the ends of the plate 6 at right angles to said plate and in the same direction as the socket, are two arms 9 and 10, the arm 9 is substantially as wide and as thick as the plate 6 and projects beyond the end of the socket 7. A threaded hole 11 is made through the arm 9 perpendicular to the axis of the socket for a thumb screw 12.

The other arm 10 is of the same length as the arm 9 but instead of a flat inner face, the face 13 thereof is made V-shaped, inclining downwardly from each edge 14 towards the center. The outer surface of the arm 10 is of convex form and inclines upwardly on a slight curve from its attachment to the plate 6 to its end. Instead of making the inner face 13 of the arm 10 V-shaped it may be of concave form as at 15, Fig. 3, with edges 14. By giving the arm 10 either of the shapes described two points of contact with the hub are produced instead of one as would be the case were the face 13 made flat or curved with a radius greater than the wheel hub.

The application of the wrench is very simple and quickly made. The thumb screw 12 is turned back and the socket 7 placed over the axle nut 3 and pushed inwardly as far as it will go, the arms 9 and 10 naturally projecting over the metal band 4 of the hub. Now, if the thumb screw 12 be tightened it will bear against the band 4 and clamp the wrench to the hub. After this operation it will only be necessary to turn the wheel rearwardly to unscrew the nut which, it is to be noted, will remain in the end of the hub because of the attached wrench. This is an important feature of the invention as the nut and wrench can in many instances, remain in position on the hub when the wheel is removed thereby preventing the misplacement of the nut or having it fall to the ground and become covered to a greater or less extent with dirt.

The opening 8 in the socket need not be an exact square, in fact, it is preferably elongated in the direction of the arms 9 and 10 so that when placed on a nut the wrench may have a slight end movement to bring the edges 14 of the arm 10 into contact with the hub.

A wrench constructed as above described forms a simple, cheap and convenient tool, and when applied, a long leverage is brought to bear on the nut for turning it by grasping the felly, or the spokes at their outer ends. The most tightly jammed nuts may by this means be removed.

What I claim is:

A wrench for vehicle nuts, consisting of a plate formed with a central angular socket projection adapted to engage a nut, and arms at its ends, adapted to overlap the hub of the wheel, one of said arms, having an inner recessed surface forming sharp edges for biting into the hub, and a binding screw on the other arm to bear against the hub.

In testimony that I claim the foregoing as my own, I have hereto affixed my signature in the presence of two witnesses.

HENRY H. PONTON.

Witnesses:
R. B. THRIFT,
A. F. THRIFT.